United States Patent
El Dokor et al.

(10) Patent No.: US 8,207,967 B1
(45) Date of Patent: *Jun. 26, 2012

(54) METHOD AND SYSTEM FOR VISION-BASED INTERACTION IN A VIRTUAL ENVIRONMENT

(75) Inventors: Tarek El Dokor, Phoenix, AZ (US); Joshua E King, Mesa, AZ (US); James E Holmes, Mesa, AZ (US); Justin R Gigliotti, Prescott, AZ (US); William E Glomski, Scottsdale, AZ (US)

(73) Assignee: Edge 3 Technologies LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/405,319

(22) Filed: Feb. 26, 2012

Related U.S. Application Data

(63) Continuation of application No. 12/028,704, filed on Feb. 8, 2008, now Pat. No. 8,144,148.

(60) Provisional application No. 60/899,971, filed on Feb. 8, 2007, provisional application No. 60/901,548, filed on Feb. 16, 2007, provisional application No. 60/966,056, filed on Aug. 27, 2007.

(51) Int. Cl.
*G06T 17/00* (2006.01)
(52) U.S. Cl. ............ 345/424; 345/158; 345/181; 348/46
(58) Field of Classification Search ......................... None
See application file for complete search history.

(56) References Cited

U.S. PATENT DOCUMENTS

| | | | | |
|---|---|---|---|---|
| 6,768,486 | B1* | 7/2004 | Szabo et al. | 345/420 |
| 7,170,492 | B2* | 1/2007 | Bell | 345/158 |
| 7,239,718 | B2* | 7/2007 | Park et al. | 382/103 |
| 7,296,007 | B1* | 11/2007 | Funge et al. | 706/47 |
| 7,489,308 | B2* | 2/2009 | Blake et al. | 345/179 |
| 2006/0221072 | A1* | 10/2006 | Se et al. | 345/420 |
| 2008/0267449 | A1* | 10/2008 | Dumas et al. | 382/103 |

* cited by examiner

*Primary Examiner* — Kee M Tung
*Assistant Examiner* — Michelle Chin
(74) *Attorney, Agent, or Firm* — Gordon Kessler

(57) ABSTRACT

Method, computer program and system for tracking movement of a subject. The method includes receiving data from a plurality of fixed position sensors comprising a distributed network of time of flight camera sensors to generate a volumetric three-dimensional representation of the subject, identifying a plurality of clusters within the volumetric three-dimensional representation that correspond to features indicative of motion of the subject relative to the fixed position sensors and one or more other portions of the subject, and presenting one or more objects on one or more three dimensional display screens. The plurality of fixed position sensors are used to track motion of the features of the subject to manipulate the volumetric three-dimensional representation to determine interaction of one or more of the features of the subject and one or more of the one or more objects on one or more of the one or more three dimensional display screens.

26 Claims, 9 Drawing Sheets

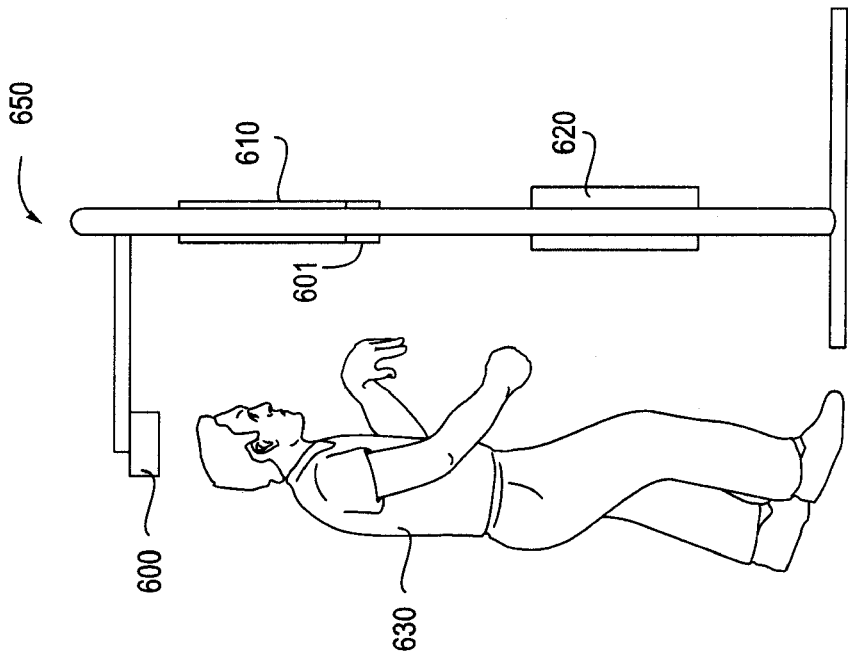
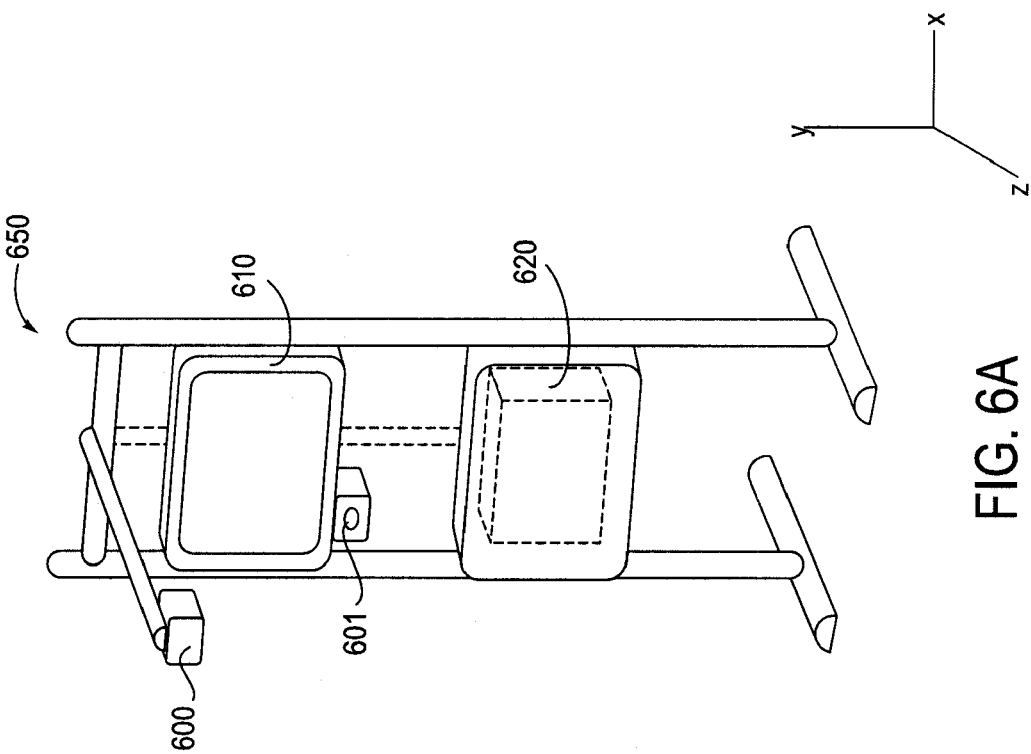
FIG. 6B
FIG. 6A

METHOD AND SYSTEM FOR VISION-BASED INTERACTION IN A VIRTUAL ENVIRONMENT

CROSS REFERENCE TO RELATED APPLICATIONS

The present application is a continuation of U.S. patent application Ser. No. 12/028,704, filed Feb. 8, 2008 to El Dokor et al., entitled "Method and System for Vision-Based Interaction in a Virtual Environment." This '704 application in turn claims the benefit of and priority to U.S. Provisional Patent Application No. 60/899,971 filed on Feb. 8, 2007, entitled "Natural Interaction in Cyberspace," Application No. 60/901,548 filed on Feb. 16, 2007, entitled "Naturally Interactive Environments" and Application No. 60/966,056 filed on Aug. 27, 2007, entitled "Multi-Player Vision-Based Aerobic Gaming Controls." U.S. Provisional Patent Applications No. 60/899,971, No. 60/901,548 and No. 60/966,056. The entire contents of each of these applications are hereby incorporated by reference.

FIELD OF THE INVENTION

The field of the invention relates generally to the field of human-machine interfaces and more particularly relates to a method and system for vision-based interaction in a virtual environment.

BACKGROUND OF THE INVENTION

Virtual and mixed reality environments provide an immersive, interactive environment where users interact with virtual objects and surroundings. In three-dimensional virtual environments, users view and interact with three-dimensional virtual objects, often with the aid of assistive tools such as glasses, gloves, tracking devices, inertial sensors, body suits and switches. In the real world, however, users observe and interact with real objects without the need for such took. The users experience in a virtual environment, therefore, is limited by a lack of realism and a lack of physical feedback from the virtual environment, as well as a lack of natural means for interaction.

In order to enhance the sense of realism, different approaches were taken. Haptics, for example, is an emerging field of technology that adds the sense of touch using tactile feedback to a virtual reality system. The user wearing a tactile feedback device touches a virtual object, then a tactile feedback device, provides feedback as if the user touched a real object even though the user did not touch anything in the real world. In addition to visual feedback, tactile feedback adds realism to the virtual experience. However, the user's experience is limited by the requirement of wearing feedback devices.

Virtual reality using only visual feedback has limitations of its own. However, due to the simplicity of the system and the latest technological development in imaging and computing technologies, more realistic vision-based virtual and mixed reality systems have been developed.

For example, EON I-Cube by EON Reality of Irvine, Calif. and Automated Virtual Environment by Fakespace Inc. of Marshalltown, Iowa display virtual objects onto a screen surrounding the user. Through the use of specialized glasses, the user is able to visualize computer-processed information in three dimensions. Supplemental inertial pointing devices allow the users to navigate and interact with the virtual world.

In other virtual reality systems such as Varrier Autostereoscopie Virtual Reality Display by the University of Illinois at Chicago, a user is presented with a partially immersive array of three-dimensional screens that display information without the need for special eyewear. However, peripheral devices are still required to interact with the virtual world.

A three-dimensional time-of-flight (TOF) sensor calculates the time-of-flight of light from a light source to the sensor and measures the distance to an object by reflecting light. The time difference is converted to the distance information when the speed of light is known, thereby measuring the distance from the sensor to the object. Three-dimensional TOF sensors have been developed by Canesta. Inc. of San Jose, Calif., CSEM of Switzerland, and 3DV Systems of Yokneant, Israel.

It would be useful and beneficial to have a system that would allow users to interact with the virtual world by three-dimensional visual feedback without the need for having peripheral devices.

SUMMARY OF THE INVENTION

A method and system for vision-based interaction in a virtual environment is disclosed. According to one embodiment, a computer-implemented method comprises receiving data from a plurality of sensors to generate a meshed volumetric three-dimensional representation of a subject. A plurality of clusters is identified within the meshed volumetric three-dimensional representation that corresponds to motion features. The motion features include hands, feet, knees, elbows, head, and shoulders. The plurality of sensors is used to track motion of the subject and manipulate the motion features of the meshed volumetric three-dimensional representation.

The above and other preferred features, including various novel details of implementation and combination of elements will now be more particularly described with reference to the accompanying drawings and pointed out in the claims. It will be understood that the particular methods and apparatus are shown by way of illustration only and not as limitations. As will be understood by those skilled in the art, the principles and features explained herein may be employed in various and numerous embodiments.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

FIG. 6A is a front-oriented perspective view of the vision-based virtual reality system, according to one embodiment;

FIG. 6B is a side-oriented view of the vision-based virtual reality system, according to one embodiment;

Figure 1:
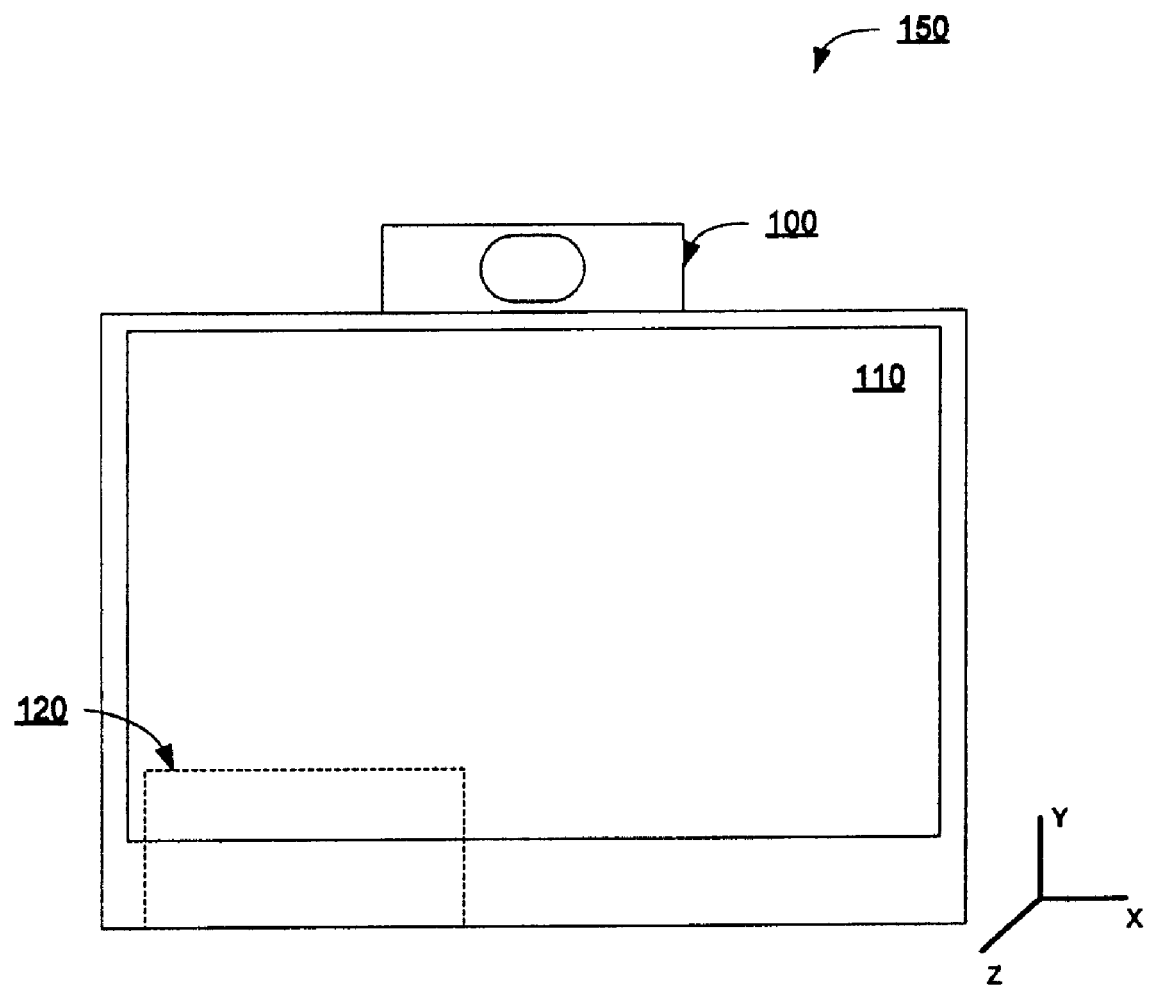
FIG. 1 illustrates an exemplary vision-based virtual reality system, according to one embodiment.

It should be noted that the figures are not necessarily drawn to scale and that elements of similar structures or functions are generally represented, by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION OF THE PREFERRED EMBODIMENTS

A method and system for vision-based interaction in a virtual environment is disclosed. According to one embodiment, a computer-implemented method comprises receiving data from a plurality of sensors to generate a meshed volumetric three-dimensional representation of a subject. A plurality of clusters is identified within the meshed volumetric three-dimensional representation that corresponds to motion features. The motion features include hands, feet, knees, elbows, head, and shoulders. The plurality of sensors is used to track motion of the subject and manipulate the motion features of the meshed volumetric three-dimensional representation.

Each of the features and teachings disclosed herein can be utilized separately or in conjunction with other features and teachings to provide a method and system for vision-based interaction in a virtual environment. Representative examples utilizing many of these additional features and teachings, both separately and combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for the purposes of explanation, specific nomenclature is set forth to facilitate an understanding of the various inventive concepts disclosed herein. However, it will be apparent to one skilled in the art that these specific details are not required in order to practice the various in inventive concepts disclosed herein.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description addition, the present invention is not described with reference to any particular programming language. It will be appreciated that a variety of programming languages may be used to implement the teachings of the invention as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

FIG. 1 illustrates an exemplary vision-based virtual reality system 150, according to one embodiment. The vision-based virtual reality system 150 includes a three-dimensional sensor 100, a display 110 and a computer 120. According to one embodiment, three-dimensional sensor 100 is a three-dimensional time-to-flight (TOF) sensor that captures the three-dimensional information of a target object. For a given point on the surface of the target object, sensor 100 captures the two-dimensional image and calculates the position of the object in X and Y coordinates. The Z-directional distance information from sensor 100 to the target object is obtained by measuring the time that light takes to travel from sensor 100 to the target object and back to sensor 100. Because the speed of the light is known, the time measurement can be used to determine the distance to the target object. According to one embodiment, sensor 100 is equipped with a plurality a light sources and light sensors in a grid pattern. According to another embodiment, sensor 100 is equipped with a limited number of light sources and light sensors but is supplemented with a driving mechanism to move the sensors and light sources. The driving mechanism allows for a larger scanning space at a desired resolution. By aggregating the measurements of multiple points on the target object, the three-dimensional geometrical information of the target object is constructed. It is understood that other suitable three-dimensional sensing mechanisms can be used without deviating from the scope of the present invention.

Time-of-flight sensor 100 renders very accurate and fast position information for the target object. Sensor 100 and the image processing capabilities of computer 120 allow system 150 to operate in real-time.

Display 110 renders the image of the target object in two- or three-dimensions. When rendering the image in two-dimensions, the depth information (in the Z-direction) is not substantially used, but it may be used to trigger an event or an action. For example, if sensor 100 detects that the object is within a predetermined distance, an associated event is triggered.

According to one embodiment, display 110 is a three-dimensional display allowing user 200 to perceive objects in a three-dimensional virtual space. According to another embodiment, display 110 is a three-dimensional stereoscopic display that requires no special eyewear for user 200 to perceive three-dimensional virtual images. Examples of such three-dimensional stereoscopic displays are the 42-3D6W01 WOW 3D LCD DISPLAY from Koninklijke Phillips Electronics N.V., Netherlands and the 3D PLASMA DISPLAY from NTT Data Sanyo System Corporation, Japan.

Computer 120 integrates and processes the data from sensor 100, and displays the processed data onto display 110. Video pre-processing is first attempted on the acquired data. There are two types of noises which impact the quality of the acquired data: white Gaussian noise associated with rendered images from sensor 100, and more importantly specularity or reflectivity noise associated with the surface specularities and reflectances of target objects. The pre-processed data including two-dimensional X and Y coordinates and Z-directional distance information is delivered to computer 120 and further data processing is performed to construct three-dimensional images to be shown on display 110. Such data processing may include data filtering, transformations, reconstruction, interpolation, image texturing, rendering, coloring, editing, etc. Post data processing of computer 120 allows user 200 to perceive real-time events of interest while minimizing background noise on the captured data. Typically, a 20-40 Hz refresh rate is considered fast enough to avoid excessive lags, but higher refresh rates may be used to construct more realistic and natural images.

According to one embodiment, system 150 is used for controlling a video game using the motions and actions of the video gamer. A peripheral device is not required to control the video game. Conventional video games require physical controllers (e.g., gamepad, keyboard, mouse, joystick or gloves)

The location of a user's hands, legs and feet are detected and measured by system 150. As the positions of the body parts of the video gamer change, a software algorithm running on computer 120 detects those movements and creates a triggering event depending on the location, direction, pattern and speed of the movements. The triggering event creates a discrete command that is used as an input to the video game controller (not shown) or any other virtual reality systems.

FIGS. 2-5 illustrate exemplary captured and processed images using three-dimensional sensor 100, according to one embodiment. Game 200 stands in front of system 150 to play a boxing game. Sensor 100 captures the image of garner 200 as shown in camera image 240. Sensor 100 also measures the distance of various objects within camera image 240.

Figure 2:
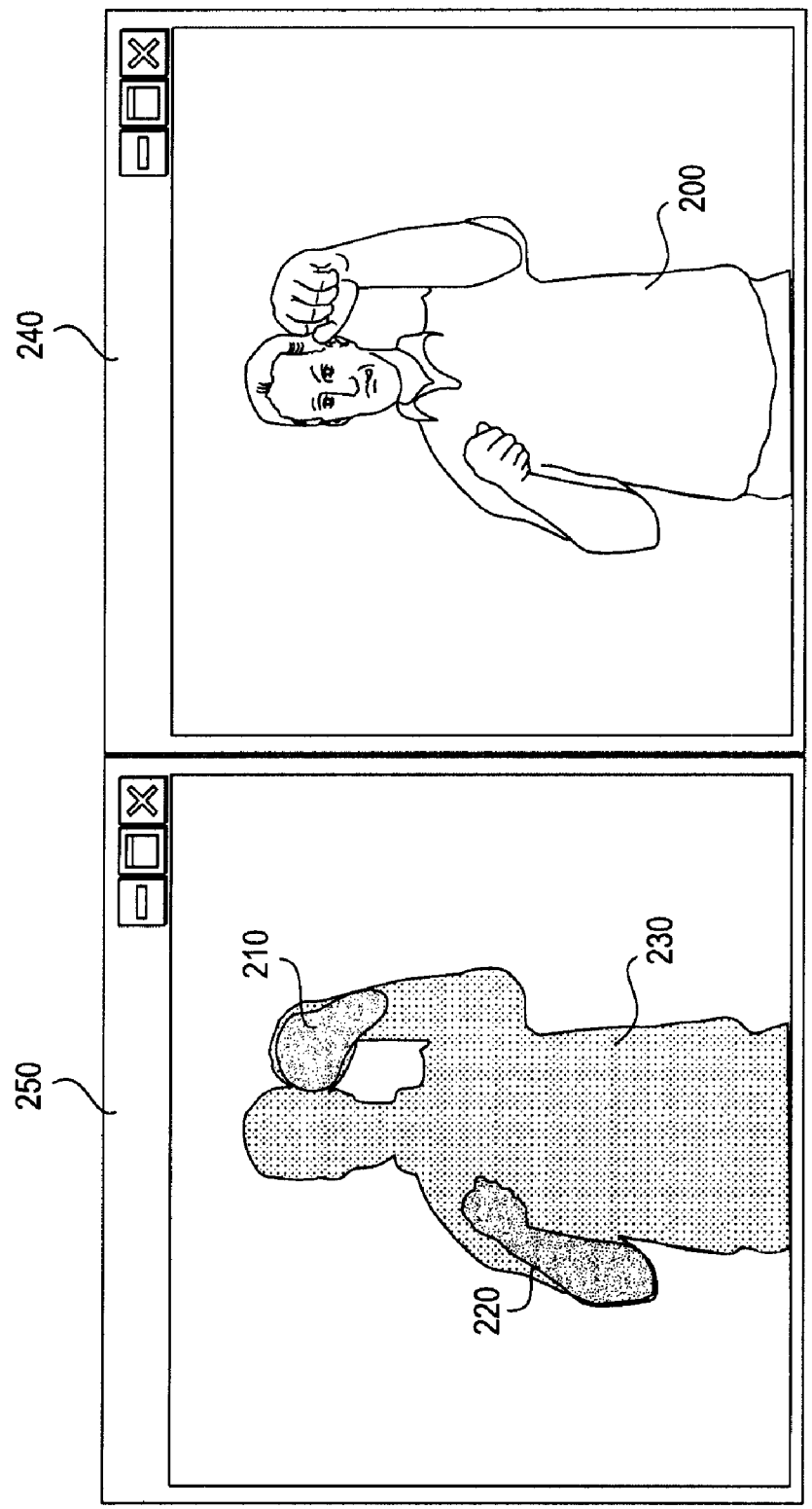
FIG. 2 illustrates an exemplary processed image for capturing a left-high punch motion using a three-dimensional sensor, according to one embodiment.
Figure 3:
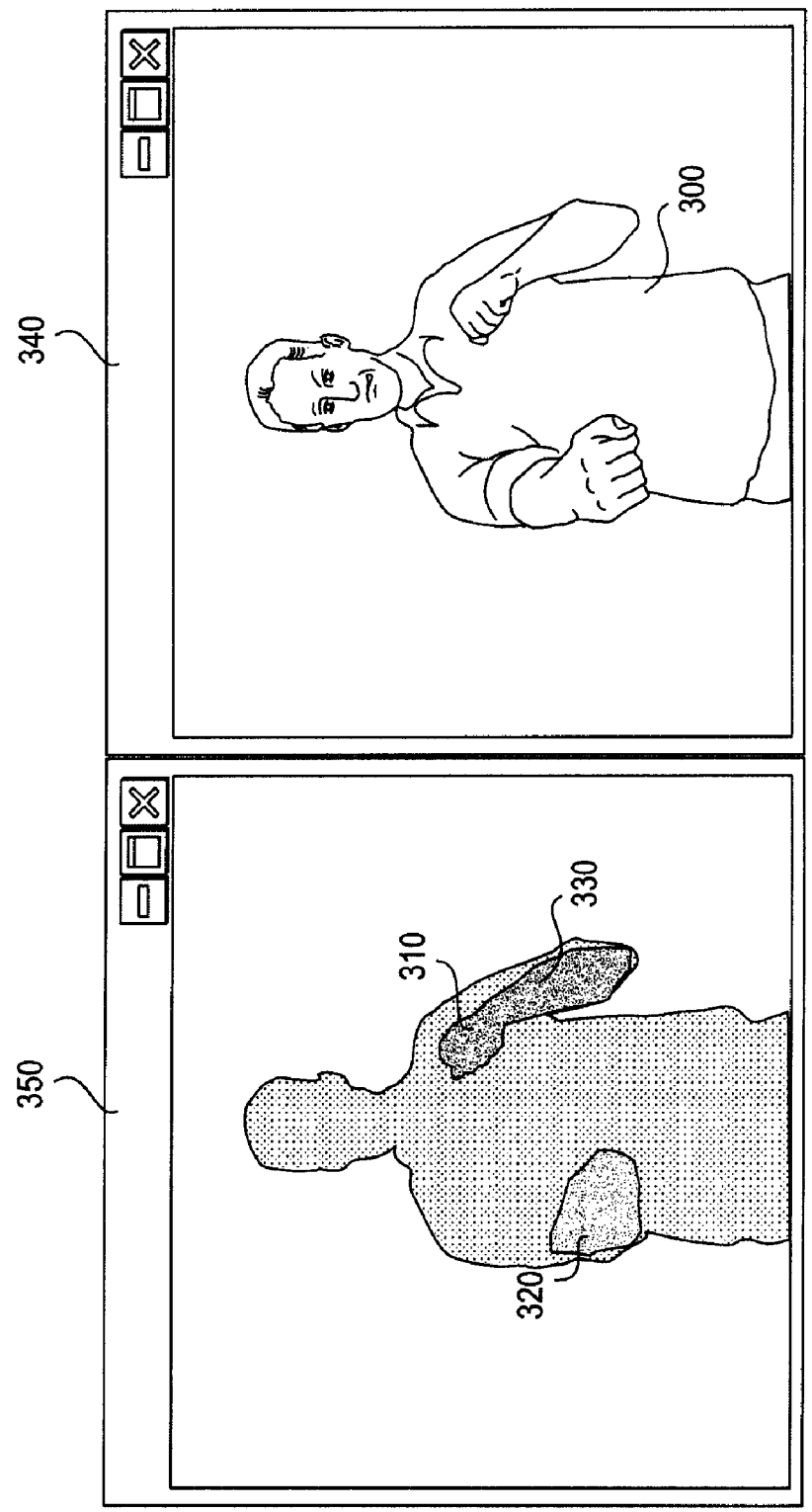
FIG. 3 illustrates an exemplary processed image for capturing a right-low punch motion using a three-dimensional sensor, according to one embodiment.

FIG. 2 illustrates an exemplary processed image 250 for capturing a left high punch motion using three-dimensional sensor 100, according to one embodiment. Game controller (or computer 120) is notified when gamer 200 throws a left high punch. Area 210 is highlighted on processed image 250. The distance to the right arm 220 is also monitored to determine if a right punch is thrown. FIG. 3 illustrates an exemplary processed image 350 for capturing a right low punch motion using three-dimensional sensor 100, according to another embodiment. When gamer 300 throws a right low punch, area 320 is highlighted on processed image 350 and computer 120 is notified a right-punch event. The body of gamer 300 is shown in gray indicating that gamer 300's body is farther away from sensor 100 than gamer 300's fists. The relative distance from the body 330 of gamer 300 to gamer 300's fists might be used to determine if a punch is thrown or not. For example, if the distance measured to the fist when subtracted from the distance to the body is greater than a predetermined value, then a punch is considered to be thrown. Referring to FIG. 2, the difference of the distances to the left fist and the body is greater than the predetermined value so that a left punch was thrown. On the other hand, the difference of the distances to the left fist and the body is smaller than the predetermined value so that a right punch was not thrown.

According to another embodiment, objects or spatial regions are tracked along various paths over time. The path itself is mapped, and data is then tracked in a four-coordinate system comprising (x, y, z, t), where x, y, z are three-dimensional spatial coordinates and t is time. As a result, various training algorithms are used on the data paths to "best-fit" the paths of predefined events.

According to one embodiment, a computational algorithm is used to detect the spatial orientation and position of the object within processed image 250. If the highlighted area 220 is skewed towards the left side of the image 250 as shown in FIG. 2, system 150 determines that a right punch is thrown. On the other hand, if the highlighted area 210 is skewed towards the right side of the image 250, system 150 determines that a left punch is thrown. It is understood that a different algorithm can be used to determine the orientation and position of an object without deviating from the scope of the present invention. For example, the orientation and position can be obtained by an artificial neural network multilayer perceptron (MLP) model through back-propagation learning based on a training database. Other learning techniques can be applied on the four-dimensional data obtained.

Figure 4:
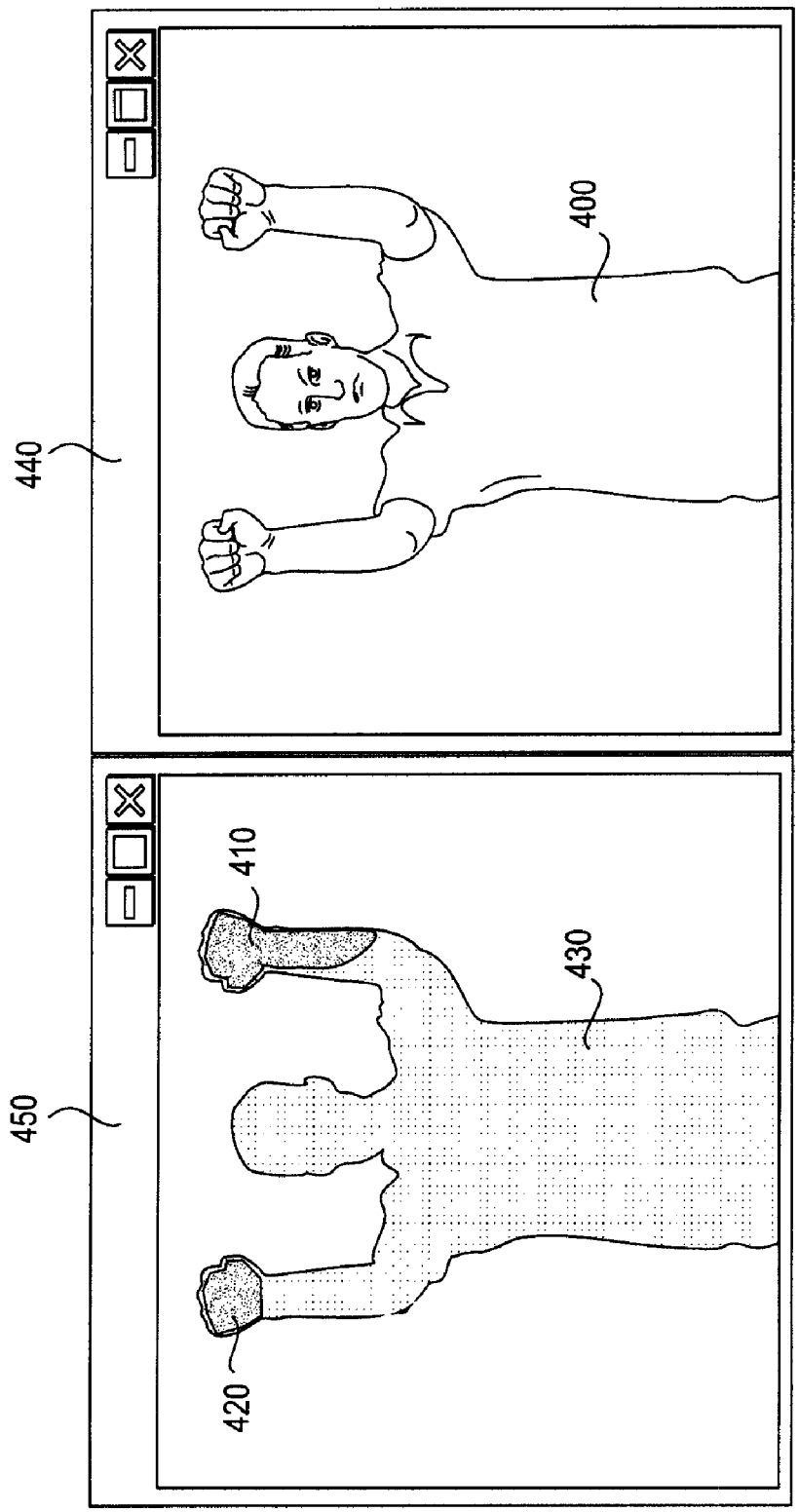
FIG. 4 illustrates an exemplary processed image for capturing a high block motion using a three-dimensional sensor, according to one embodiment.

FIG. 4 illustrates an exemplary processed image 450 for capturing a high block motion using three-dimensional sensor 100, according to one embodiment. Gamer 400 raises both hands indicating a high block. This time, punches are not thrown, rather both hands are raised and areas 410 and 420 are highlighted as a result. System 150 identifies each fist as objects 410 and 420 within processed image 450. The distances to objects 410 and 420 are calculated in three-dimensions and system 150 determines that garner 400 intended a high block.

Figure 5:
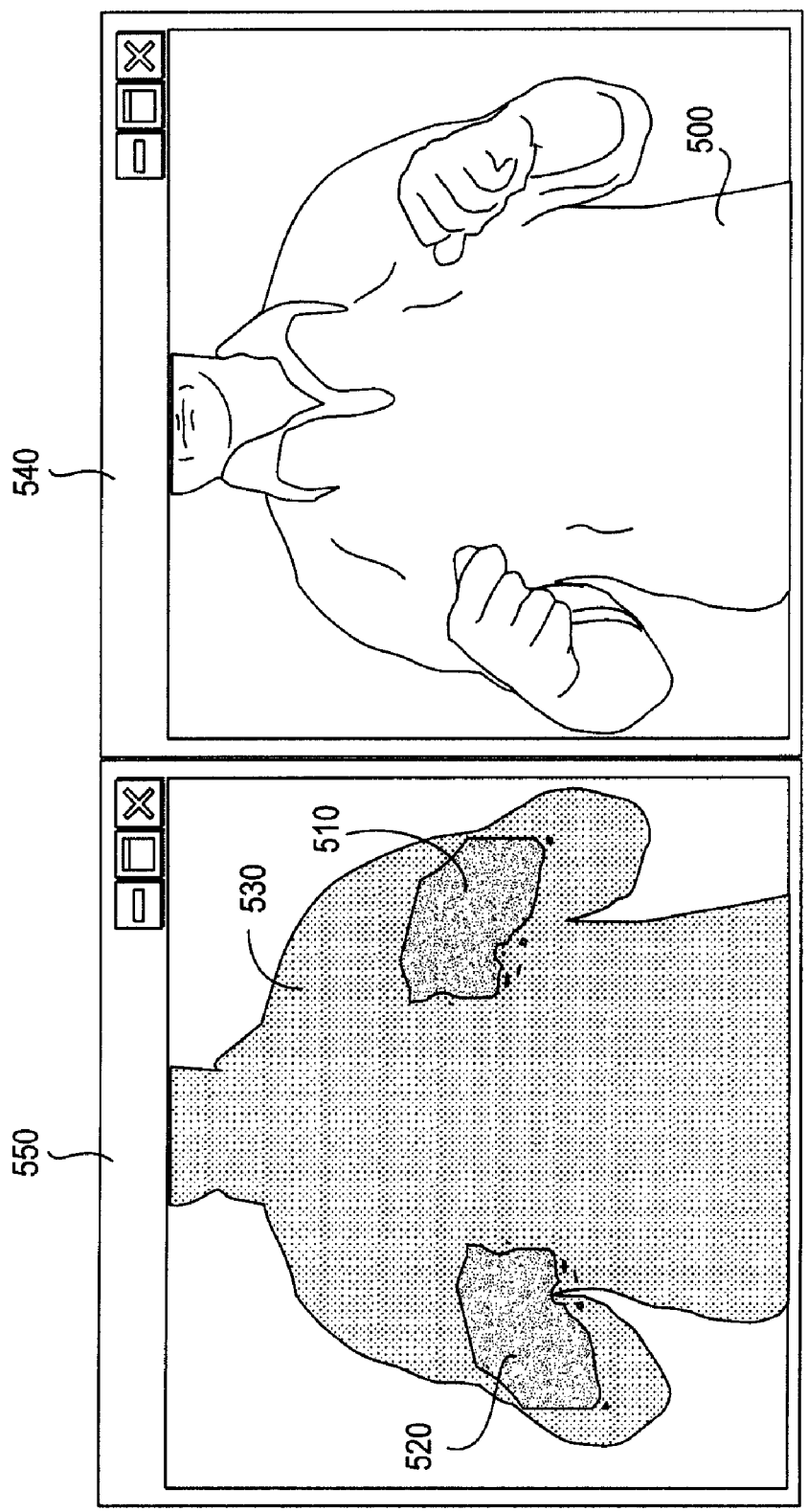
FIG. 5 illustrates an exemplary processed image for capturing a forward body motion using a three-dimensional sensor, according to one embodiment.

FIG. 5 illustrates an exemplary processed image 550 for capturing a forward body motion using three-dimensional sensor 100, according to one embodiment. Gamer 500 approaches sensor 100, therefore the area 530 (the body of gamer 500) fills a larger portion of processed image 550. In this case, an 'approach' event is triggered. The opposite 'withdraw' event is detected when system 150 determines that area 530 decreases within processed image 550. Another approach may be taken to detect such a forward body motion. Clusters leaving the main cluster (i.e. body) is monitored and temporally tracked as they traverse in a three-dimensional space. The path in which such clusters leave the main cluster may be used to identify various events and motions.

If more sensing elements are used, one can achieve a higher resolution. Therefore, depending on the application and computing resources, the resolution of sensor 100 might be optimized to achieve appropriate performance while providing a real-time immersive experience to a gamer.

By using different techniques and algorithms, many different events can be created and mapped to control a video game. A series of events might be monitored and recorded over a period of time to create a history- or time-dependent event and thus recognize gestures incorporating temporal characteristics. In a certain video game, a combination of user inputs may trigger a unique event. For example, if a right punch is thrown while approaching, a more damaging punch can be thrown.

A multi-player game can be played using two or more systems 150, one for each player. Each system 150 captures the image of a player and each computer 120 coupled to the system 150 processes the data collected by sensor 100 and controls an individual input from the player. According to one embodiment, a single computer 120 may be shared to process data from multiple sensors 100. According to another embodiment, a separate dedicated computer may be used to collectively process data from multiple sensors 100. A special event can be created by processing the motions from multiple players, which is not possible using dedicated computers for each player.

According to one embodiment, a multi-player game connects multiple players over a network. In such cases, computer 120 of each system 150 might capture the raw data from sensor 100 and upload it to a network computer that processes the raw data. The networked computer also communicates with each computer 120 to provide visual feedbag associated with the other players.

FIG. 6A is a front-oriented perspective view of a vision-based virtual reality system 650, according to one embodiment. Sensor 600 may be mounted in a plurality of positions with respect to the player. Multiple sensors 600 or 601 are used to form a distributed sensor network and create a meshed volumetric three-dimensional image within a confined area. The distributed network of TOF sensors allows for gesture recognition algorithms.

Sensor 600 is mounted using an arm at the top of vision-based virtual reality system 650. Sensor 601 is mounted on the front side of system 650 or on a wall surrounding user 630. Computer 620 displays the processed image of sensor 600 and/or sensor 601 on display 610. Sensor 600 captures the two-dimensional image in X-Z plane and measures the negative Y-directional distance to the object under itself. Sensor 601 captures the two-dimensional image in X-Y plane and measure the Z-directional distance to the object placed in front of system 650.

FIG. 6B is a side-oriented view of a vision-based virtual reality system 650, according to one embodiment. User 630 stands under a top-mounted or ceiling-mounted sensor 600, which captures the three-dimensional spatial information about user 630. Unlike system 150, sensor 600 of system 650 is positioned above user 630. Multiple sensors including wall-mounted sensor 601 and top-mounted sensor 600, may be mounted in a different position. According to one embodiment, user 630 is immersed in a space surrounded by a plurality of sensors. For example, wall-mounted sensors 601 are positioned on the four walls surrounding user 630 and an additional ceiling-mounted sensor 600 is positioned above user 630. The movements and actions of user 630 are captured and processed to determine discrete command inputs to the control system 650. Redundant information may be obtained from multiple sensors but is useful for minimizing self occlusions as well as noise and for refining the desired command inputs that user 630 intended. Each wall surrounding user 630 may be equipped with a three-dimensional display 610 to provide immersive visual feedback to user 630.

Figure 7:
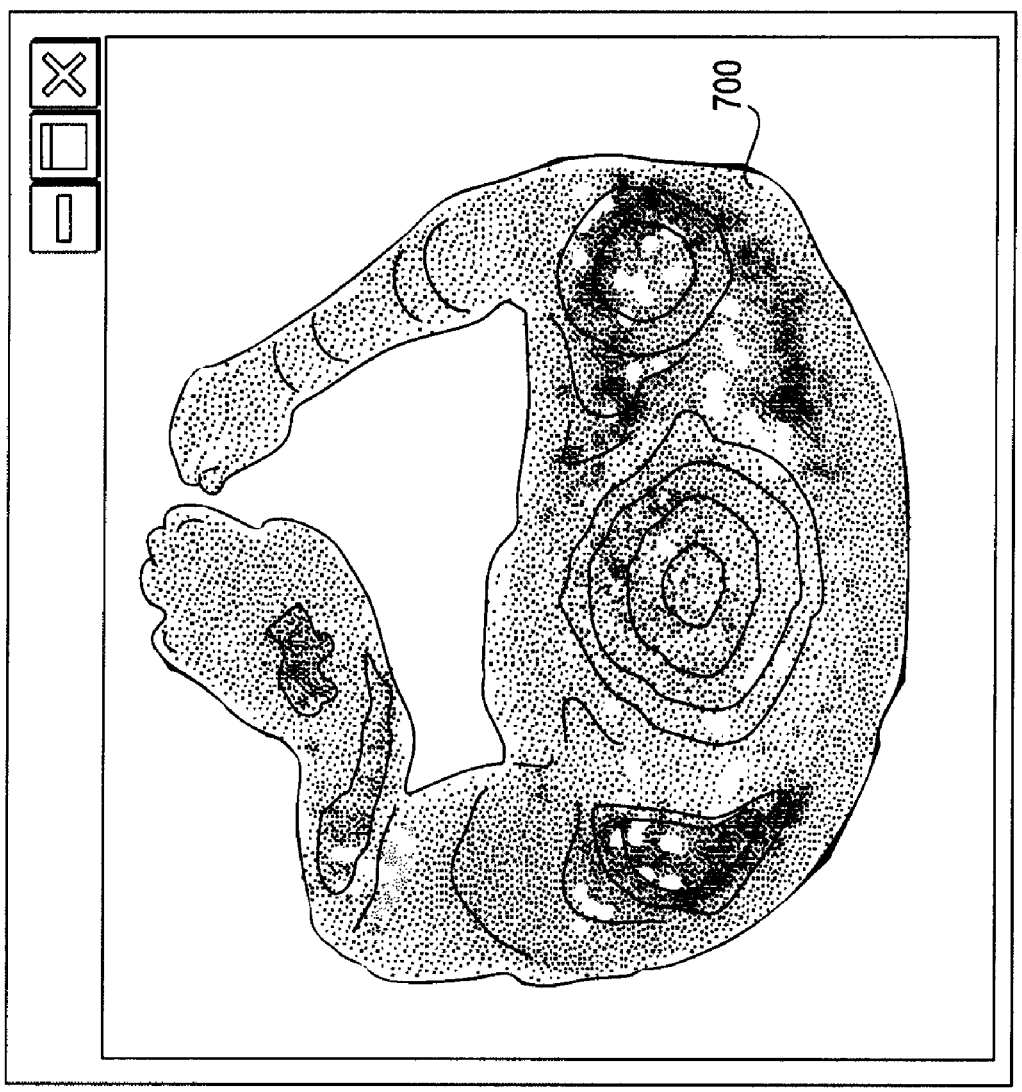
FIG. 7 illustrates an exemplary top-oriented processed image of the user, according to one embodiment.

FIG. 7 illustrates an exemplary top-oriented processed image of user 630 taken with top-mounted sensor 600, according to one embodiment. For the purpose of illustration, the depth information is illustrated with contour lines in gray scale. Computer 620 runs a software algorithm that analyzes the processed image. As user 630 moves his/her body parts, the specific movement is captured, analyzed and compared with a library of predefined motions and events. The library of predefined motions, objects and events may be stored on computer 620 or any other storage devices connected to computer 620. User 630 can create an event associated with a certain motion (or combinations of motions) and store it on the library. Depending, on the result of the analysis, an appropriate action may be taken. For example, user 630 raises his/her left hand, and the software algorithm registers the motion as a lift left hand event. A variety of motions can be pre-leaned, trained or taught by the software algorithm.

According to on embodiment, computer 620 conducts two approaches for integrating new gestures: 1) supervised learning in which various Hidden Markov models are used in conjunction with Bayesian learning to refine the gesture dictionary, and 2) unsupervised learning in which self-organizing maps define a reorganization of a neural network to best match the input data.

Figure 8:
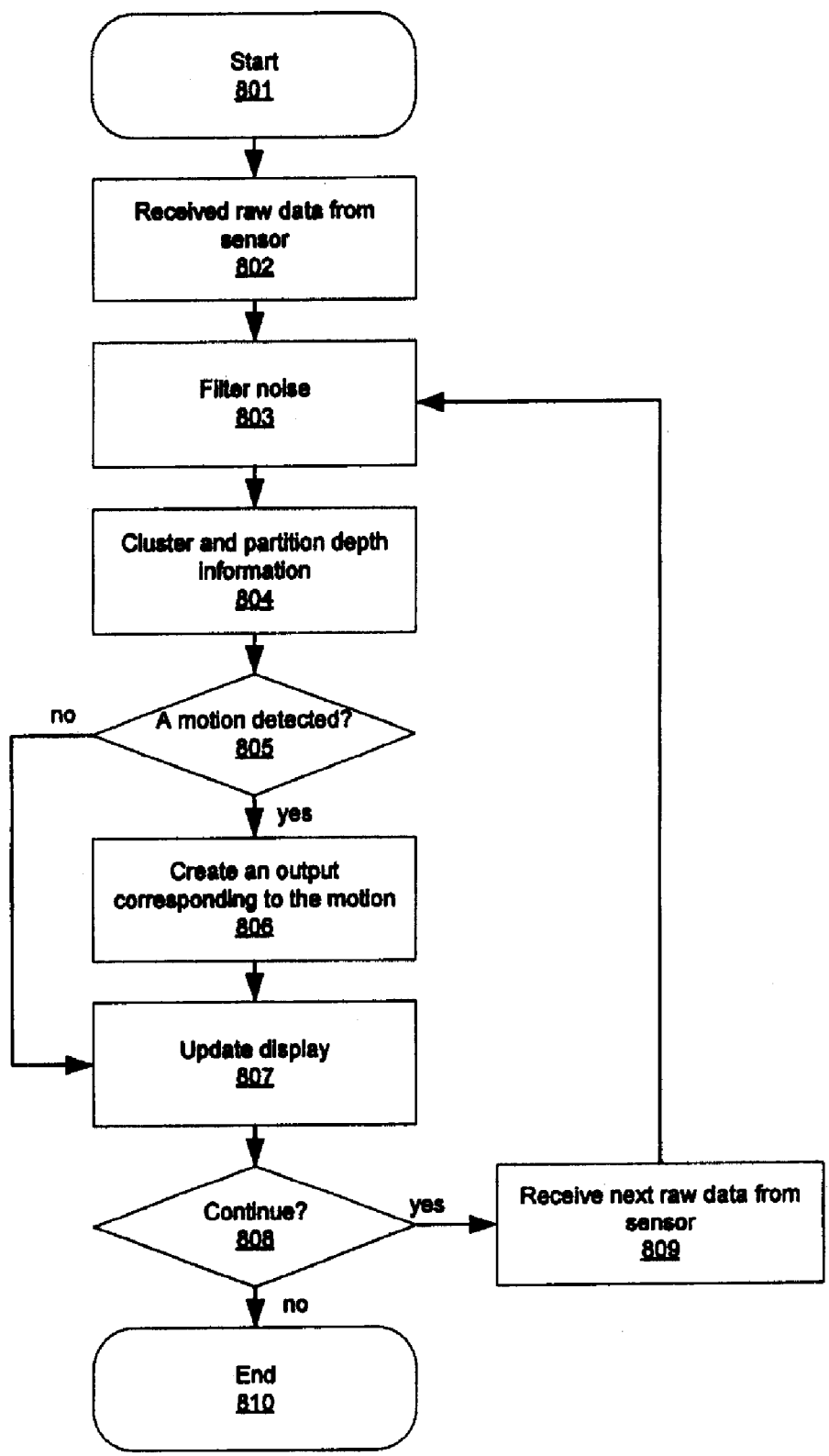
FIG. 8 illustrates an exemplary data processing flowchart, according to one embodiment

FIG. 8 illustrates an exemplary data processing flowchart, according to one embodiment. The software algorithm, as referenced above, receives raw data from a sensor (802) and processes the received raw data such as noise filtering or signal transformations from one domain to another domain for extracting specific information contained in the captured data (803). Based on the processed data, depth information is clustered and partitioned, for example, using a mean-shift algorithm (804). The three-dimensional sensor space in which user 630 is contained and sensor 600 or 601 covers is partitioned into discrete volumetric, elements, called dual-state cuboids. The software algorithm determines whether each cuboid is populated or not by input data from user 630 and tracks the changes of states of all cuboids within the three-dimensional sensor space (805). If necessary, the changes of states of the cuboids are recorded for a period of time to detect a history- or time-depending motion. If a motion is detected, an appropriate output command is created and delivered to, for example, a gaming controller (806) and display 610 updates (807). If there is no motion detected, the output command is bypassed and display 610 updates (807). Without an interruption to stop, the next set of raw data is received (809) and the processes repeat.

According to one embodiment, system 150, 650 or the combination of systems 150 and/or 650 may be used to control the actions of a video game such as Xbox 360® by Microsoft Corporation, PlayStation® 3 by Sony Computer Entertainment or Wii™ by Nintendo. Discrete commands detected by the software algorithm are linked to a control device (e.g., a gamepad, a game controller, a wireless remote controller) to control the video game. This capability allows game players the ability to control existing video games with their body motions instead, of conventional video control inputs typically realized by pressing buttons, moving around the game controller. For a multi-player video game, each player is equipped with a separate system 150 or 650 to provide controls to the motion of each character in the multi-player video game.

According to another embodiment, system 150, 650 or the combination of systems 150 and/or 650 may be used to control the movement of a virtual character within a virtual world such as Second Life by Linden Research Inc. Second Life is an Internet-based virtual world wherein a user creates his/her virtual character called Avatar, socialize and participate in individual and social activities, create and trade items with virtual money and provides services to or receives services from other virtual characters. Instead of using conventional input methods such as pressing a buttons or keys on a computer keyboard, a real action can be used to participate in those activities to add reality to the action. For example, a handshaking motion may be used to exchange handshakes with other virtual characters.

According to yet another embodiment, system 150, 650 or the combination of systems 150 and/or 650 may be used for virtual exercises, computer augmented virtual environment (CAVE) or virtual training programs.

According to one embodiment, a set of distributed wall or ceiling mounted sensors is provided to enhance the resolution and widen the sensor space, as well as facilitate distributed vision algorithms applied to the sensor. For example, multiple sensors 600 or 601 are positioned in a grid pattern so that inter-sensory interference is minimized. The grid of sensors provides computer 620 with information necessary to construct a virtual interactive space surrounding user 630. User 630 is free to move within the sensor space and the motions of user 630 are captured by the plurality of sensors. The locations of the sensors and the coverage space by those sensors are known.

Each sensor 600 or 601 is calibrated based on user 630's bio-metrics and orientation with respect to display 610. Once the calibration is done, computer 620 projects an initial three-dimensional image associated with the application to display 610, for example user 630 is immersed under water. The three-dimensional aquatic environment is projected on the surrounding walls. As user 630 swims underwater, various types of underwater life forms emerge and interact with user 630. By performing natural swimming strokes and interacting with surroundings, user 630 explores the three-dimensional underwater virtual environment.

According to another embodiment, virtual reality system 150 or 650 may be used for psychological treatment purposes. For example, a patient with height phobia may be initially placed in a virtual space that causes no fear. Depending on the progress of the therapy, the patient can be placed at increasing heights.

According to yet another embodiment, virtual reality system 150 or 650 may be used for occupational training purposes. For example, a soldier is placed in a virtual war zone. The soldier may be given a mission or a task to successfully finish the training program. Since the training requires physical action and reaction with the environment, the training program offers close-to-real experiences. The training program can also be easily switched without physically transporting the trainee to a different environment.

According to one embodiment, a network interface may be used to link a local station (i.e. system 150 or 650) with one or more remote stations. Objects located in the sensor space of the remote stations may be transferred over the network to be displayed as virtual objects at the local station, therefore the sensor spaces of multiple stations can be overlapped or intertwined to create a networked and collaborated virtual space.

Figure 9:
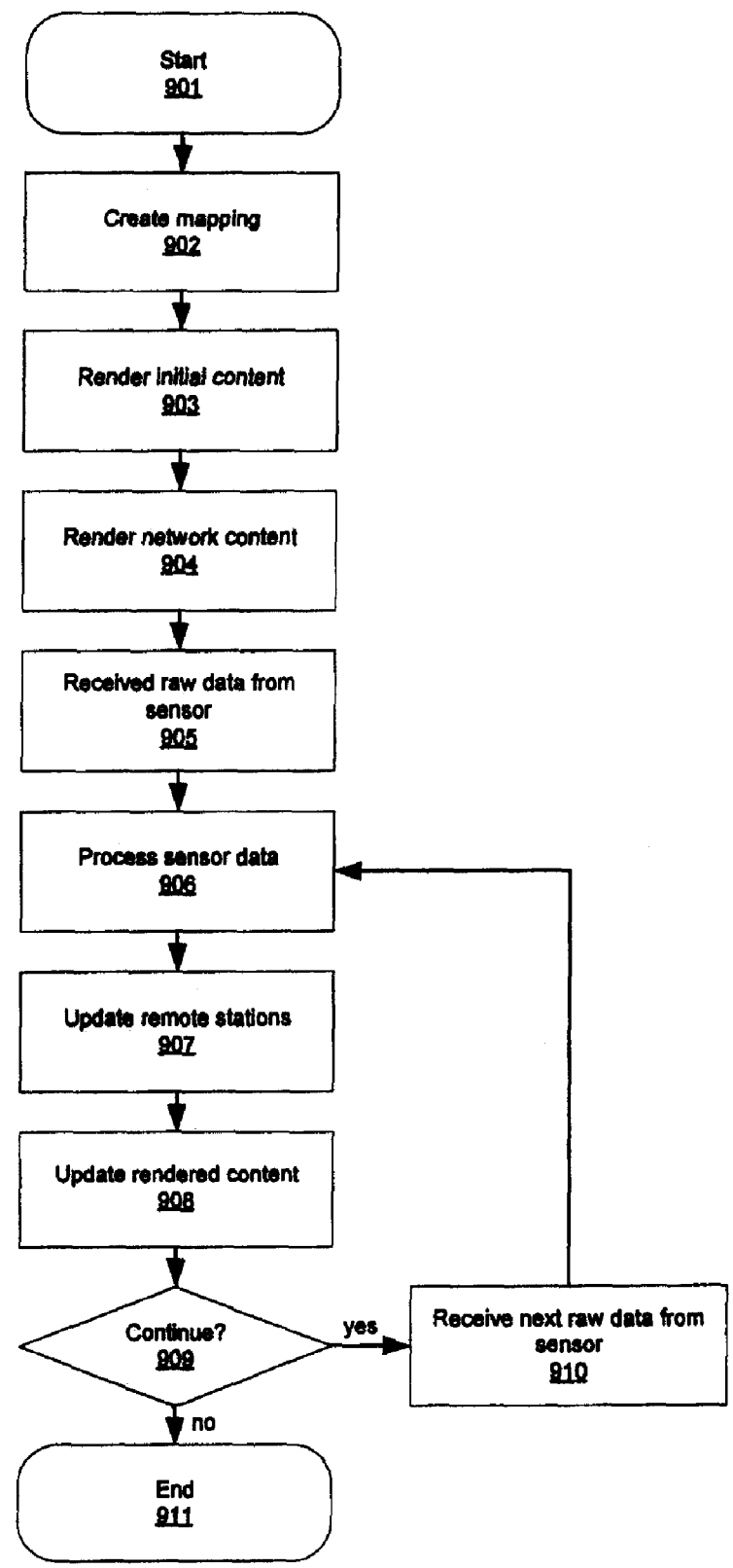
FIG. 9 illustrates an exemplary data processing flowchart for a networked virtual reality system, according to one embodiment.

FIG. 9 illustrates an exemplary data processing flowchart for a networked virtual reality system, according to one embodiment. The systems coordinates are mapped to the virtual environment's coordinate system to register user interactions with a virtual environment (902). A predefined or simplified mapping scheme may be used or a mapping or registration session starts to correlate the coordinate systems from the real world to the virtual world. Typically, three-dimensional coordinates and three-dimensional orientations are required to uniquely and completely map from a space to another space. After the mapping is completed, the initial content of the application is rendered on display 610 (903). If system 150 or 650 is connected to other remote stations through the network interface, the objects on the remote stations are also rendered on the local station as virtual objects (904). The local and remote objects might be rendered simultaneously. After the objects within the virtual space are rendered, system 150 or 650 receives data from one or more sensors 600 and/or 601 equipped therein (905) and processes and analyze the data from the sensors (906). Pertinent information caused by the uses interactions with the virtual space on the local station is transferred to all the other remote stations through the network interface and updated on the remote stations (907). The display on the local station is also updated by the user interactions on both local and remote stations (909). Same processes repeat (906-910) to continue the virtual real-time experiences.

A software development kit (SDK) may be provided to the developers of the present system. No specific machine vision or computer gaming knowledge is required to use SDK to develop an application. Using an intuitive graphical user interface, SDK allows application developers to define certain body actions and gestures, and create custom events.

The SDK is aimed for software developers of game controls. The SDK provides game developers with a set of tools to perform motion capture and analysis. According to one embodiment, the SDK takes into account the user's anatomical constraints, real-time constraints, sensor resolution, a total number of sensors, and pixel depth. The SDK identifies and tracks key segments during motion capture in three dimensions. Examples include head, shoulders, hands, feet, elbows and knees. Such segments are applicable to many games and help produce a deformable three-dimensional avatar that is capable of closely mirroring a user's physical movements. Body segments are simplified into a set of key points and are linked together to create a basic skeletal structure of the avatar. Training can then be accomplished to improve tracking and recognition accuracy by tracking the key points. To facilitate fast implementation into computer games, a visual development environment (VDE) exists for the SDK that optimizes the SDK for a particular application by graphically selecting body segments to track. For example, spheres are placed at key segments on the avatar and the paths thereof are tracked as a part of the training process. Clicking on the spheres will highlight the corresponding body segment and toggle the tracking state. This graphical feature provides a way for developing games faster and more intuitively. The resulting interface compiles into a dynamic link library to easily integrate with other code.

According to one embodiment, the networked virtual reality system may be used in a video game where each player is physically remote and connected by the network. Each player's action is locally processed and an appropriate command or update is transferred to the other's station to locally interpret the action. Alternatively, each player's local station may be connected to a central station to collect, process and distribute data to relieve the computational burden in each local station.

According to another embodiment, a users non-photo-real image is integrated into the virtual environment. A non-photoreal avatar resembling the user is integrated and rendered into the game. This feature differentiates system 150 or 650 from other camera-based virtual reality systems (e.g., Eye-Toy® by Sony Computer Entertainment) in which the users true visual data is applied to the game. An effective approach is taken to warp the user's data to best match a non-photoreal color-space associated with the game. Users can populate different characters, moods and facial expressions in the game. With different skill levels and characteristics, a user's character is allowed to change and evolve. Such character evolution represents a nonlinear transformation, such as eigen faces fusion or landmarking between the avatar and the user.

According to one embodiment, the networked virtual reality system might be used in a virtual tele-presense application such as virtual tele-conferencing. A user is immersed in a virtual environment in a virtual conference room, for example, to conduct a job interview. Remote users, for example, interviewers, are shown as virtual objects in a virtual environment whose actions and gestures are updated on the user's display 610. The interactions among the users are observable to any party participating in the tele-conferencing since they are projected and updated on all the participant's display 610, thus providing a pure virtual experience.

According to one embodiment, the networked virtual reality system might be used in a virtual collaboration workspace. For example, two or more users participate in a computer aided design (CAD) project. Components of the design may be manipulated by each user's gestures and actions. Users may utilize virtual pointing devices such are rulers, pencils or sticks for accurate manipulation of delicate components. All changes performed at one station by a user are updated and transferred on all other networked stations.

Common to all of the exemplary applications is the capability of two or more users to interact in a virtual space. Remote users are displayed as virtual objects, however, the virtual objects are derived from the real data at remote stations, thus the real world characteristics of the remote users are preserved. The interaction among users, therefore, becomes as natural and intuitive as if the remote users are physically present in the same place.

The usage of TOF sensors allows robust data acquisition under various lighting conditions. If a stereoscopic camera systems are used, the reconstruction of three-dimensional object data from captured images depends significantly on external lighting conditions. Since the independent light source is used to measure the depth information, system 150 or 650 provides robust data acquisition irrespective of external lighting conditions.

Another advantage of using TOF sensors is the capability of real-time data processing. The refresh rate of typical TOF sensors is 40 Hz, which is sufficiently fast for a user to sense no latency for the visual update. The biggest advantage of the present virtual reality system is the elimination of peripheral devices for controlling or providing inputs to the system. Without the need for such peripheral devices, the user's experience with the virtual environment is more natural, interactive and realistic.

Although the preferred embodiments of the present invention have been illustrated and described in detail, it will be readily apparent to those skilled in the art that various modifications may be made therein without departing from the sprit of the present invention or from the scope of the appended claims.

What is claimed:

1. A computer-implemented method for tracking movement of a subject, comprising:
   receiving data from a plurality of fixed position sensors comprising a distributed network of time of flight camera sensors to generate a volumetric three-dimensional representation of the subject;
   identifying a plurality of clusters within the volumetric three-dimensional representation that correspond to features indicative of motion of the subject relative to the fixed position sensors and one or more other portions of the subject;
   presenting one or more objects on one or more three dimensional display screens; and
   using the plurality of fixed position sensors to track motion of the features of the subject to manipulate the volumetric three-dimensional representation to determine interaction of one or more of the features of the subject and one or more of the one or more objects on one or more of the one or more three dimensional display screens.

2. The computer-implemented method of claim 1, wherein each of the one or more three dimensional display screens displays three dimensional information without the use of special eyeware by the subject.

3. The computer-implemented method of claim 1, wherein each of the one or more three dimensional screens displays three dimensional information employing special eyeware by the subject.

4. The computer-implemented method of claim 1, further comprising identifying one or more events corresponding to the tracked motion of the subject.

5. The computer-implemented method of claim 4, wherein identifying one or more events further comprises matching the motion of the subject with an event stored in an event library.

6. The computer-implemented method of claim 5, wherein the one or more identified events comprises one or more controlling events for controlling a computer.

7. The computer-implemented method of claim 1, wherein the subject interacts with the one or more objects as they would appear in a real environment.

8. The computer-implemented method of claim 1, wherein a plurality of the one or more three dimensional display screens is arranged to provide a plurality of different views of the subject.

9. The computer-implemented method of claim 8, wherein the plurality of the one or more three dimensional display screens is arranged to provide a substantially 360 degree display to the subject.

10. A computer-implemented method for tracking movement of a subject, comprising:
    receiving data from a plurality of fixed position sensors comprising a distributed network of time of flight camera sensors to identify a plurality of clusters corresponding to features indicative of motion of the subject relative to the fixed position sensors and one or more other clusters;
    presenting one or more objects on one or more three dimensional display screens; and
    using the plurality of fixed position sensors to track motion of the features of the subject to determine interaction of one or more of the features of the subject and one or more of the one or more objects on one or more of the one or more three dimensional display screens.

11. The computer-implemented method of claim 10, further comprising identifying one or more events corresponding to the tracked motion of the subject.

12. The computer-implemented method of claim 11, wherein identifying one or more events further comprises matching the motion of the subject with an event stored in an event library.

13. The computer implemented method of claim 10, wherein the tracked motion is used to operate a video game.

14. The computer implemented method of claim 10, wherein the tracked motion is used in a virtual learning environment.

15. The computer implemented method of claim 10, wherein the tracked motion is used in a virtual collaboration workspace.

16. A non-transitory computer-readable medium having stored thereon a plurality of instructions, the plurality of instructions when executed by a computer, cause the computer to perform:
    receiving data from a plurality of fixed position sensors comprising a distributed network of time of flight camera sensors to generate a volumetric three-dimensional representation of the subject;
    identifying a plurality of clusters within the volumetric three-dimensional representation that correspond to features indicative of motion of the subject relative to the fixed position sensors and one or more other portions of the subject;

presenting one or more objects on one or more three dimensional display screens; and using the plurality of fixed position sensors to track motion of the features of the subject to manipulate the volumetric three-dimensional representation to determine interaction of one or more of the features of the subject and one or more of the one or more objects on one or more of the one or more three dimensional display screens.

17. A system for tracking motion of a subject, comprising:

a plurality of fixed position sensors comprising a distributed network of time of flight camera sensors, at least data received from the plurality of fixed position sensors being used to generate a volumetric three-dimensional representation of the subject;

a processor for identifying a plurality of clusters within the volumetric three-dimensional representation that correspond to features indicative of motion of the subject relative to the fixed position sensors and one or more other portions of the subject; and one or more three dimensional display screens for presenting one or more objects thereon; and wherein the plurality of fixed position sensors is used to track motion of the features of the subject to manipulate the volumetric three-dimensional representation, and the processor is used to determine interaction of one or more of the features of the subject and one or more of the one or more objects on the one or more three dimensional display screens.

18. The system of claim 17, wherein each of the one or more three dimensional display screens displays three dimensional information without the use of special eyeware by the subject.

19. The system of claim 17, wherein each of the one or more three dimensional screens displays three dimensional information employing special eyeware by the subject.

20. The system of claim 17, wherein the tracked motion is identified as corresponding to one or more events.

21. The system of claim 17, wherein one or more of the plurality of fixed position sensors is mounted in a bezel of one or more of the one or more three dimensional displays.

22. The system of claim 17, wherein one or more of the plurality of fixed position sensors is mounted adjacent one or more of the one or more three dimensional displays.

23. The system of claim 22, where one or more of the plurality of fixed position sensors is mounted in a wall.

24. The system of claim 17, wherein one or more of the plurality of fixed position sensors is positioned within a discrete unit separated from each of the one or more three dimensional displays.

25. The system of claim 24, wherein the discrete unit is mounted adjacent one or more of the one or more three dimensional display screens.

26. The system of claim 24, wherein the plurality of fixed position sensors comprises a distributed grid of sensors.

* * * * *